June 27, 1967  L. A. STOYELL ET AL  3,328,183

REFRACTORIES

Filed Aug. 16, 1965  2 Sheets-Sheet 1

INVENTORS
HAROLD S. REDLINE
LOYAL A. STOYELL

BY
ATTORNEY

June 27, 1967 L. A. STOYELL ETAL 3,328,183
REFRACTORIES
Filed Aug. 16, 1965 2 Sheets-Sheet 2
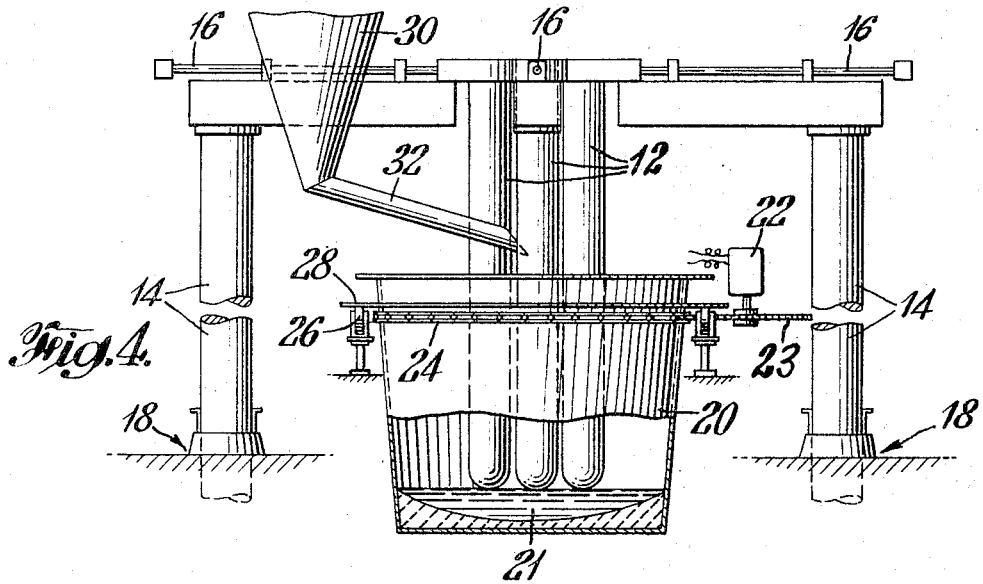
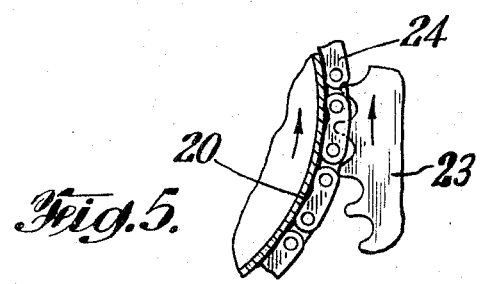
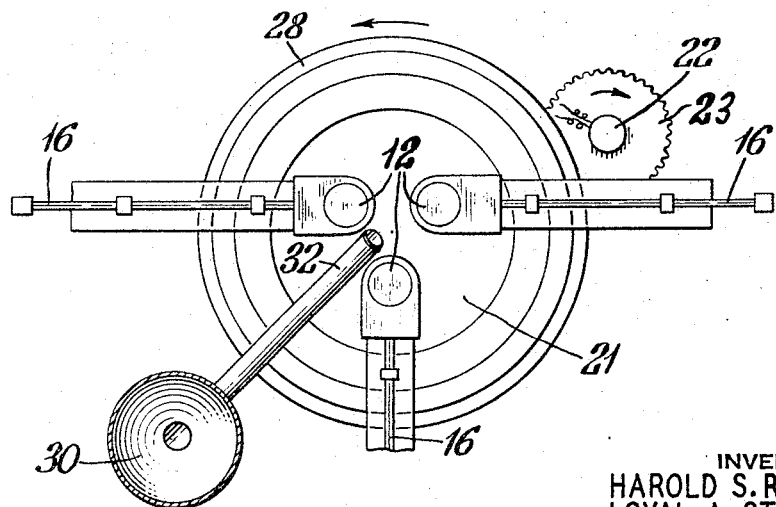
INVENTORS
HAROLD S. REDLINE
LOYAL A. STOYELL
BY Frederick J. McCarthy
ATTORNEY

United States Patent Office 3,328,183
Patented June 27, 1967

---

3,328,183
REFRACTORIES
Loyal A. Stoyell, Tonawanda, and Harold S. Redline, Lewiston, N.Y., assignors to Union Carbide Corporation, a corporation of New York
Filed Aug. 16, 1965, Ser. No. 479,963
2 Claims. (Cl. 106—59)

The present invention relates to basic refractory material. More particularly the present invention relates to basic refractory material formed by the melting and resolidification of a mixture of chrome ore and magnesia.

The present invention represents an improvement over the material disclosed and claimed in United States Patent 3,116,156. The material of the aforementioned patent, as stated therein, is a melted and resolidified mixture of chrome ore and magnesia consisting essentially of by analysis:

15–25% $Cr_2O_3$
45–75% $MgO$
4–20% $Al_2O_3$
3–15% $FeO$
0.5–3% $SiO_2$
Up to 3% $CaO$

The molar ratio of CaO to $SiO_2$ in this material is no greater than 2:1 and the structure of the material comprises predominantly, relatively large, abutting grains of periclase, crystals of spinel contained within the periclase grains, and isolated pockets of silicates contained within the periclase grains.

The material of U.S. Patent 3,116,156 has been found to be an excellent refractory material and brick made from this material is characterized by low porosity, resistance to iron bursting, volume stability and strength.

However, there is always a demand for further improvements in the properties of refractory materials particularly high temperature strength.

It is therefore an object of the present invention to provide a refractory having greatly improved high temperature strength in addition to having low porosity, resistance to iron bursting, and volume stability.

Other objects will be apparent from the following description and claims taken in conjunction with the drawing in which:

FIGURE 4 is a sectional elevation view of a furnace suitable for use in the practice of the present invention.

FIGURE 5 is a plan view of the furnace of FIGURE 4, and

FIGURE 6 shows, in somewhat more detail, a part of the furnace of FIGURE 4.

A refractory material in accordance with the present invention is a melted, resolidified and particulated mixture of chrome ore and magnesia consisting essentially of by analysis: 15 to 25 percent $Cr_2O_3$; 45 to 75 percent $MgO$; 4 to 20 percent $Al_2O_3$; 3.0 to 15.0 percent $FeO$; 0.5 to 3.0 percent $SiO_2$; and up to 3.0 percent $CaO$; the molar ratio of CaO to $SiO_2$ being no greater than 2:1 and the structure of said refractory material comprising predominantly, relatively large, abutting grains of periclase grains; and crystals of spinel contained within the periclase grains, the major portion of spinel being in the form of crystals, having a maximum dimension not greater than 10 microns.

Burned bricks and like articles suitable for the construction of steel furnaces can be prepared from the aforedescribed material by first crushing the material to a desired particle size distribution in accordance with known techniques. The crushed material is then mixed with a suitable binder such as Bindarene, a lignin sulfonate binder, and the mix is pressed to the desired shape and size. After pressing, the brick is dried and fired to produce a ceramic bond between the particles. It has been found that heating for about 3–6 hours at 1600° C.–1700° C. is suitable. An advantage of the refractory material of the present invention is that die size allowances are not necessary in pressing the brick since there is negligible volume change in the brick during the subsequent firing. When a satisfactory ceramic bond has been provided between the refractory particles as a result of firing, the burned brick is ready for installation and use as a basic refractory in steel furnace construction and provides superior performance.

Figure 1:
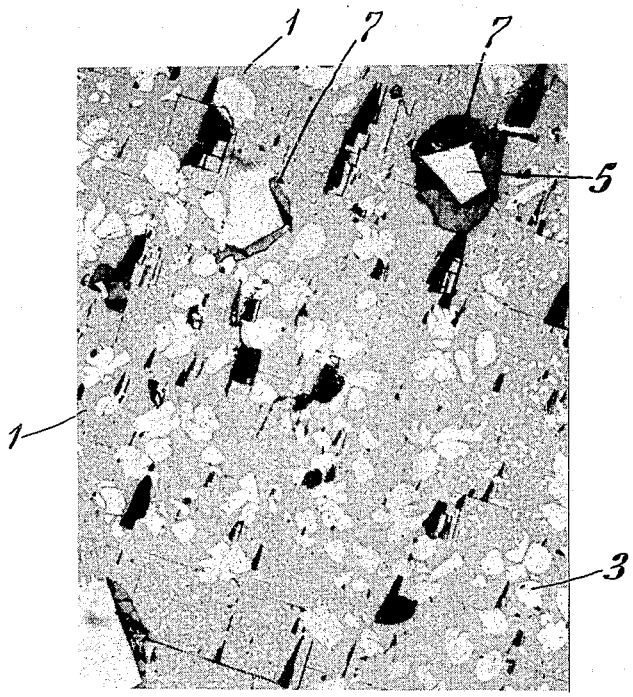
FIGURE 1 is a photomicrograph (original magnification 200×) of the structure of the material of U.S. Patent 3,116,156 and is the same as FIGURE 1 of that patent.

With reference to FIGURE 1, which is the material of size. After pressing, the brisk is dried and fired to produce U.S. Patent 3,116,156, it can be seen, and as is stated in the patent, that this figure represents a fused refractory material in which the grey background material indicated as 1 is periclase containing numerous exsolved crystals of spinel indicated as 3 and some euhedral crystals of spinel which are indicated as 5. The average diameter of periclase grains in the material of FIGURE 1 is 1 mm. and most of the spinel is in the form of crystals having an average diameter of about 25 microns or larger FIGURE 1 also shows isolated pockets of silicates 7 occurring throughout the periclase grain.

Figure 2:
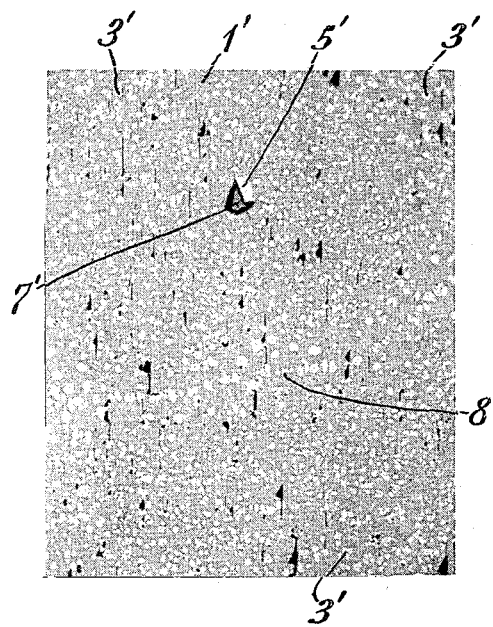
FIGURE 2 is a photomicrograph (original magnification 200×) of the material of the present invention.

By way of comparison, in FIGURE 2, which shows material in accordance with the present invention, a portion of a periclase grain is shown in which the periclase appears as a grey background 1'. The periclase grain contains numerous exsolved crystals of spinel indicated as 3' and some euhedral crystals of spinel indicated at 5'. Isolated pockets of silicate which occur throughout the periclase grain are shown at 7'. The boundary between periclase grains is shown at 8.

It can be seen that except for the size of spinel crystals 3 and 3' the materials of FIGURES 1 and 2 are similar in structure. As previously stated, most of the spinel in the material of FIGURE 1 is in the form of crystals of at least 25 microns average diameter, whereas in the material of FIGURE 2, the major portion of spinel is in the form of crystals having a maximum dimension not greater than 10 microns. The average diameter of the periclase grains of the material of FIGURE 2 is 1 mm. It has been found that the material of FIGURE 2, having its spinel constituent mostly in the form of very small spinel crystals 3', as compared to 3 of FIGURE 1, possesses substantially improved properties as hereinbelow illustrated even though the materials of FIGURES 1 and 2 have substantially the same analysis as shown in Table I.

TABLE I

Figure 3:
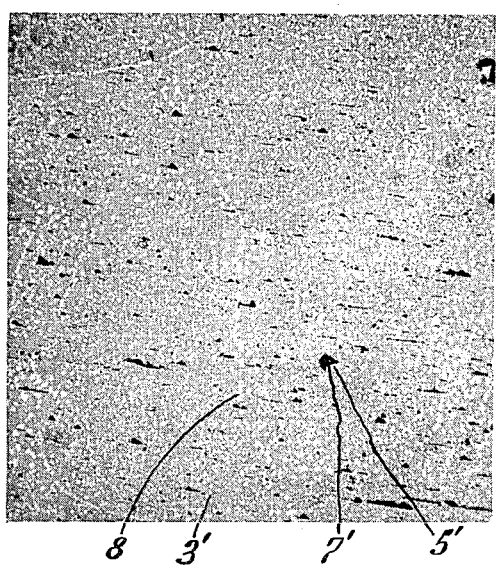
FIGURE 3 is a photomicrograph (original magnification 100×) of material of the present invention.

|  | Figure 1 | Figures 2 and 3 |
|---|---|---|
| MgO | 60.7 | 62.8 |
| $Cr_2O_3$ | 20.4 | 18.7 |
| $SiO_2$ | 1.0 | 1.03 |
| FeO | 10.4 | 10.6 |
| CaO | 0.7 | 0.7 |
| $Al_2O_3$ | 5.9 | 5.7 |

Material of the present invention characterized by having most of its spinel constituent in the form of very small crystals is produced by providing in an electric furnace a mixture of chrome ore and magnesia and uniformly heating the mixture to a temperature of about 2100° C. to provide uniform melting of the mixture. The melted material is then caused to solidify slowly in the electric furnace to produce a hearth product. In the practice of the present invention in addition to slow cooling of the molten material, it is most important to provide a uniform temperature throughout the molten material prior to solidification. This is accomplished by employing a furnace having a rotating furnace shell in which the charge is heated by three vertically positioned stationary electrodes, arranged in a triangular configuration centrally located within the furnace shell. With equipment of this type, which is more specifically described hereinbelow in connection with the drawing, the required uniform heating of the furnace charge and a uniform temperature in the molten material is obtained which permits the formation of a furnace hearth material in which the structure is as shown in the photographs of FIGURES 2 and 3, i.e. the major portion of the spinel constituent being in the form of crystals having a maximum dimension of not larger than 10 microns.

With reference to FIGURES 4 and 5 of the drawing, a steel furnace shell is indicated at 20 and graphite electrodes for heating the furnace charge are indicated at 12. Masts 14 support the electrodes in position and electric power is supplied to the electrodes through bus-bars 16 from a suitable three phase supply (not shown). The masts 14, and hence the electrodes 12 can be raised and lowered hydraulically as shown at 18. In operation, a mixture of chrome ore and magnesia, in proportions which will provide a product of the desired composition, e.g. 60% MgO, 40% chrome ore can be used, is introduced into the bottom of the furnace shell 20 and spread in a layer about 6 inches in depth. The electrodes are then energized with three phase alternating current to provide melting of the magnesia-chrome ore mixture. When a molten pool of material appears beneath the electrode, as shown at 21, rotation of the furnace shell is commenced by means of motor 22 which drives sprocket gear 23. Sprocket gear 23 engages chain 24, which is fixedly attached to the furnace shell 20, and causes the furnace shell to rotate on rollers 26 which support the furnace shell at ring 28.

Concurrently with the commencement of furnace shell rotation, additional chrome ore-magnesia mixture is introduced, continuously, into the furnace shell from hopper 30 via chute 32. The mixture is introduced at a predetermined rate, and power is supplied by the electrodes at a rate of about 0.8 to 1.1 kilowatt-hour per pound of charge. In practice the actual operating conditions are determined by the capabilities of the equipment. For example, if the total charge is to be 48,000 pounds, a typical amount, and the electrodes can deliver 5500 kilowatts to the charge, the feed rate of the charge is suitably 6000 pounds per hour. The total operating time is thus on the order of eight hours.

It has been found that to provide the material of the present invention, rotation of the furnace shell is necessary and that this rotation should be between 1 and 6 revolutions per hour. At slower rotations super-heating of portions of the mixture occurs and the spinel constituent of the resulting product does not conform to the small crystal sizes of the present invention. At faster rotations, the product contains relatively large proportions of unfused or incompletely reacted material. A shell rotation speed of about 1-2 revolutions per hour has been found to be optimum.

In operation of the furnace, the mixture introduced by way of chute 32, suitably sized (chrome ore 65 x D, magnesia 6 x D) is gradually melted beneath the electrodes and flows out of the sides of the furnace shell and, as the molten material rises in the shell, the electrodes are raised correspondingly. As a result, the lower portion of the molten material slowly and gradually solidifies as a hearth. This procedure is continued until the entire charge, which usually ranges between 20,000 and 50,000 lbs., has been melted, after which power to the electrodes is discontinued and rotation of the furnace shell is stopped. The material then cools in the furnace shell until its temperature averages between about 300 and 500° C. at which time the shell is inverted. The hearth material falls free from the furnace and is permitted to cool in air to about 100° C. at which time it is broken into pieces of about 250 pounds, which are placed in skips and transported to crushers where these large pieces are reduced to suitable size for subsequent handling, usually about 2" x 6 mesh.

Particular advantages of the aforedescribed method, in addition to the production of a unique material, are power efficiency and product recovery. For example, using a rotating furnace operation, as previously described, 1½ r.p.h. rotation, the average power required to melt 48,000 lbs. of mix was 50% less than that required to melt the same amount of material when the furnace shell was maintained stationary. Additionally, in the rotating furnace operation of this invention, less than 10% of the final product was incompletely fused whereas with stationary furnace operation, at least 20% of the final material was less than completely fused. Moreover, with stationary furnace operation, material having the structure of FIGURES 2 and 3 was not obtained, the spinel constituent being mostly in the form of particles of 25 microns average diameter or larger.

The following example will further illustrate the present invention.

EXAMPLE I

A furnace of the type shown in the drawing was provided. The furnace shell was 7.3 feet in height having an oustide top diameter of 9 feet and an outside bottom diameter of 8.5 feet. The furnace shell was made of ¾-inch thick steel and the electrodes, 18 inches in diameter were formed of graphite and were arranged in a triangular configuration with the center line of each of the electrodes being about 21 inches from the center line of the furnace shell.

A blended charge in proportions of about 60% magnesia and 40% chrome ore, in the amount of 48,000 lbs., was prepared using materials having the analysis shown below. The magnesia was sixed 6 x D and the chrome ore was sized 65 x D.

|  | Chrome Ore, Percent by Weight | Magnesia, Percent by Weight |
|---|---|---|
| SiO₂ | 1.3 | 0.9 |
| CaO | 0.6 | 0.06 |
| MgO | 10.4 | 97.8 |
| FeO | 26.7 | 0.26 |
| Cr₂O₃ | 47.1 |  |
| Al₂O₃ | 13.8 | 0.72 |

A portion of the charge, in the amount of 6000 lbs. was introduced into the furnace and spread to a depth of about 6 inches.

Power, three phase, 60 cycle, 285 volts phase voltage was supplied from the electrodes at 5500 kw. for about 10-15 minutes by which time a pool of molten material formed below the electrodes. Rotation of the hearth was then commenced at 1½ r.p.h. and mix was fed to the furnace at a rate of 5600 pounds per hour. Power was supplied from the electrodes at a rate of 5500 kw. Under these conditions the charge was melted and resolidified in the furnace shell to form a hearth product, the entire operation taking about 7½ hours. At the end of this time, power input to the furnace was discontinued and the product material cooled in the furnace shell for about 30 hours at which time the average temperature of the material was about 400° C. The hearth material in the furnace shell was then removed by inverting the shell after which the material was cooled in air until the average temperature was about 100° C. At this time, the hearth product was broken into pieces about 250 pounds each and transported to a gyratory crusher where the material was sized to 2" x 6 mesh.

Microscopic examination of the material showed the structure of FIGURES 2 and 3. At least 80 percent of the spinel constituent was in the form of crystals which were no greater than 10 microns in any direction.

Analysis of the material was as follows:

$Cr_2O_3$ ---------------------------------- 18.7
MgO ------------------------------------ 62.8
$SiO_2$ ---------------------------------- 1.03
FeO ------------------------------------ 10.6
CaO ------------------------------------ 0.7
$Al_2O_3$ -------------------------------- 5.7

EXAMPLE II

To prepared burned brick in accordance with the present invention, refractory material of this invention is prepared as in Example I and crushed to obtain 1 in. by D material. This material then passed through a two-step gyratory crushing and part of the resulting material processed through a vibrating mill to obtain a desired particle size distribution as shown in the table below.

| Proportion, percent: | Particle size, mesh |
|---|---|
| 25 | +8 |
| 26 | −8+20 |
| 15 | −20+60 |
| 7 | −60+150 |
| 7 | −150+325 |
| 20 | −325 |

The sized material is subsequently mixed in a rotating mixer with 2.5 to 3 percent by weight of an aqueous 40 percent solution of Bindarene, a lignin sulfonate binder. A weighed amount of the mix is pressed to approximately 10,000 p.s.i. in a steel die to produce a brick 9" x 4½" x 2½". The pressed brick is dried in a tunnel drier at 110° C. After drying, the brick is fired at about 1600° C. for about 4½ hours to develop a ceramic bond between the refractory particles. The brick resulting has sufficient strength for handling and installation and can be used directly in steel furnace construction.

Following substantially the same procedure as Example II burned brick was prepared from material designated as "A" and "B." The material "A" had a structure corresponding to FIGURE 1 and the material "B" had the structure of FIGURES 2 and 3 and was material of the present invention.

The analysis of the respective materials were substantially the same as shown in Table II.

TABLE II

|  | "A" | "B" |
|---|---|---|
| $Cr_2O_3$ | 17.9 | 18.7 |
| MgO | 62.1 | 62.8 |
| $Al_2O_3$ | 5.9 | 5.7 |
| FeO | 11.0 | 10.6 |
| $SiO_2$ | 1.0 | 1.03 |
| CaO | 0.7 | 0.7 |

Burned brick prepared from the respective "A" and "B" materials were subjected to identical tests to provide comparative data.

Table III shows the values of modulus of rupture (MOR) which were obtained. The testing for modulus of rupture was as follows:

*Modulus of rupture*

Employing a standard testing machine, this test involves supporting the sample on bearing cylinders with a span of 7 and applying the load at the mid-span of the opposite surface. The rate of load application should not exceed 0.05 inch per minute. For elevated temperature tests the sample to be tested is placed in a cold furnace and brought to the desired test temperature and held for a sufficient period of time to attain an equilibrium temperature and the load applied until rupture occurs. The test employed is substantially identical to that described in ASTM test C 133–55.

TABLE III

|  | "A" | "B" |
|---|---|---|
| Room Temperature, p.s.i. | 1,500 | 1,800 |
| 2,300° F., p.s.i. | 1,750 | 2,580 |
| 2,450° F., p.s.i. | 1,080 | 1,450 |

The increased modulus of rupture, MOR, of burned brick in accordance with the present invention is very significant since the value of MOR indicates the ability of a brick to provide service in applications such as steel furnace construction. For example, brick of the "B" material has been found to provide 40% or more increase in service life as compared to the "A" material.

Table IV shows further comparative data for burned brick made from the materials "A" and "B."

TABLE IV

| Material | Apparent Porosity | Reheat Change | Underload Deformation Percent | Iron Bursting Area Expansion Percent |
|---|---|---|---|---|
| A | 16–16.5 | 0 | 0.8–1.2 | 1.7 |
| B | 12–13 | 0 | 0.2–0.8 | 0.3 |

From the foregoing description, it can be seen that the present invention provides a new refractory material having superior mechanical properties.

The improved modulus of rupture, MOR, of the material of the present invention is attributable to the unique structure of the material wherein the major portion of the spinel constituent is in the form of small crystals in which crystals the maximum dimension is 10 microns. The presence of silicates in a discontinuous phase, i.e. pockets, is important and has the effect of enhancing resistance to "iron bursting" since the silicates cannot act as a channel for the conduction of iron bearing oxides into the material. The presence of silicates in pockets instead of as a continuous phase also avoids volume change upon melting of the silicates at service temperatures.

The mesh sizes referred to herein are Tyler Screen Series.

What is claimed is:

1. As a refractory material, a melted and resolidified and particulated mixture of chrome ore and magnesia consisting essentially of by analysis 15 to 25 percent $Cr_2O_3$; 45 to 75 percent MgO; 4 to 20 percent $Al_2O_3$; 3 to 15 percent FeO; 0.5 to 3.0 percent $SiO_2$; and up to 3 percent CaO; the molar ratio of CaO and $SiO_2$ in said material being no greater than 2:1 and the structure of said material comprising predominantly, relatively large, abutting grains of periclase, crystals of spinel contained within said periclase grains, the major portion of spinel being in the form of crystals having a maximum dimension not greater than 10 microns; and isolated pockets of silicates.

2. As a refractory article, pressed and fired particles of refractory material consisting essentially of by analysis 15 to 25 percent $Cr_2O_3$; 45 to 75 percent MgO; 4 to 20 percent $Al_2O_3$; 3 to 15 percent FeO; 0.5 to 3 percent $SiO_2$; and up to 3 percent CaO; the molar ratio of CaO and $SiO_2$ in said material being no greater than 2:1 and the structure of said material comprising predominantly, relatively large, abutting grains of periclase, crystals of spinel contained within said periclase grains, the major portion of spinel being in the form of crystals having a maximum dimension not greater than 10 microns; and isolated pockets of silicates.

References Cited

UNITED STATES PATENTS

| | | | |
|---|---|---|---|
| 3,079,452 | 2/1963 | Grollier-Baron et al. | 106—57 |
| 3,116,156 | 12/1963 | Charvat | 106—59 |

TOBIAS E. LEVOW, *Primary Examiner.*

J. E. POER, *Assistant Examiner.*